(No Model.) 2 Sheets—Sheet 2.

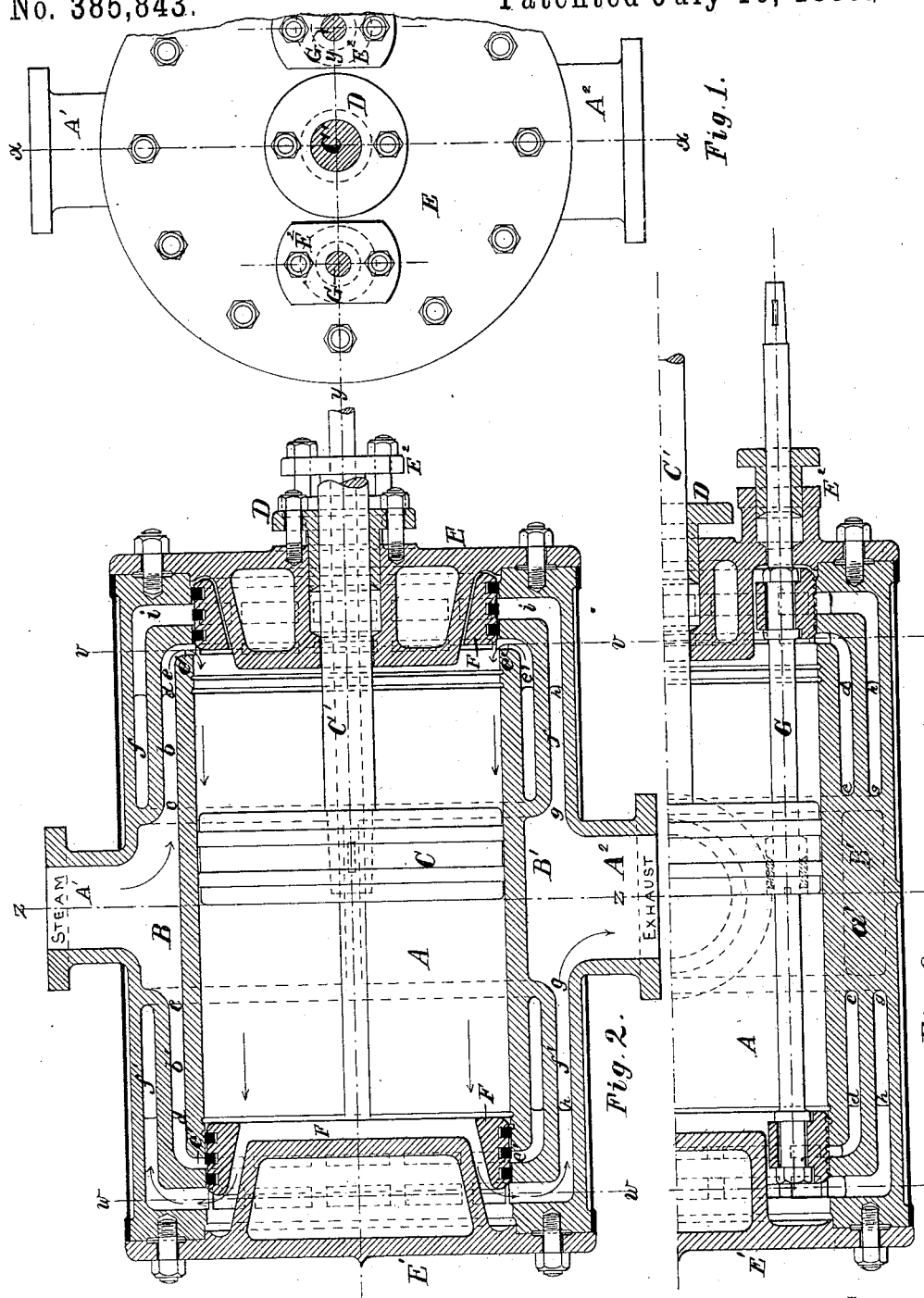

F. D. CHILD.
VALVE FOR STEAM ENGINES.

No. 385,843. Patented July 10, 1888.

Witnesses,
Geo. A. Sewall
James T. Murray.

Inventor
Franklin D. Child.
by N. C. Lombard
Attorney.

UNITED STATES PATENT OFFICE.

FRANKLIN D. CHILD, OF NEWTON, MASSACHUSETTS.

VALVE FOR STEAM-ENGINES.

SPECIFICATION forming part of Letters Patent No. 385,843, dated July 10, 1888.

Application filed February 4, 1888. Serial No. 262,992. (No model.)

*To all whom it may concern:*

Be it known that I, FRANKLIN D. CHILD, of Newton, in the county of Middlesex and State of Massachusetts, have invented certain new and useful Improvements in Valves for Steam-Engines, of which the following, taken in connection with the accompanying drawings, is a specification.

My invention relates to steam-engines, and particularly to the valves and steam passages and ports; and it consists in certain novel features of construction, arrangement, and combination of parts, which will be readily understood by reference to the description of the drawings and to the claims to be hereinafter given, and in which my invention is clearly pointed out.

Figure 5:
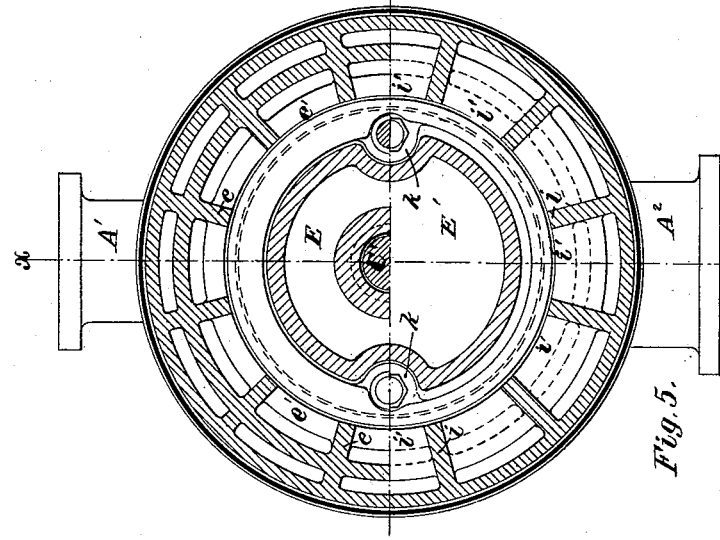
Figure 7:
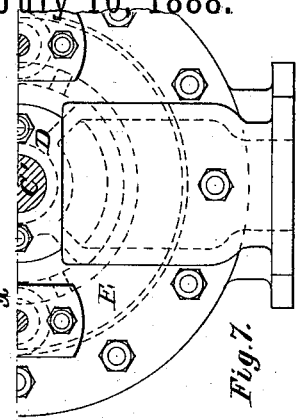
Figure 4:
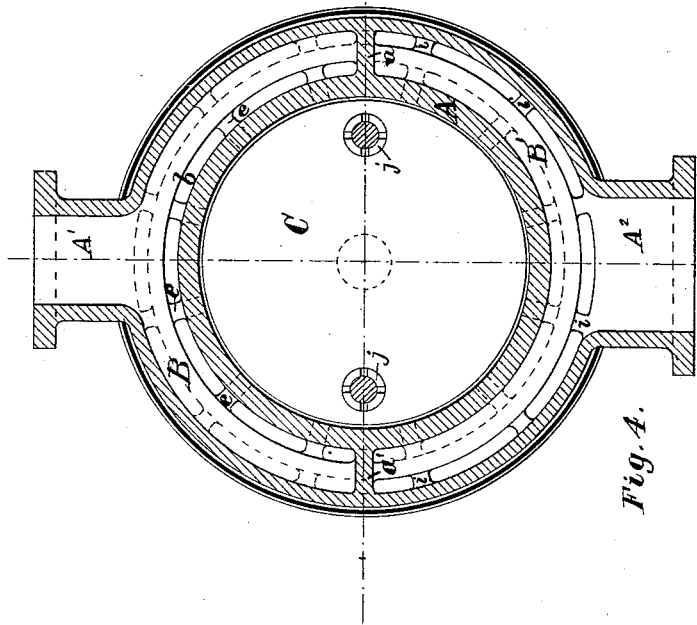
Figure 6:
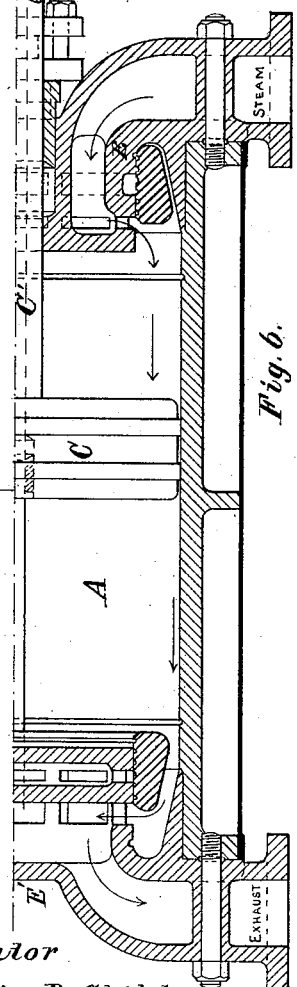

Figure 1 is an end elevation of the larger part of a steam-engine cylinder having my invention applied thereto. Fig. 2 is a longitudinal section on line $xx$ on Figs. 1 and 5, but showing the piston and piston-rod in plan. Fig. 3 is a half-section on line $yy$ on Fig. 1, and showing the piston, piston-rod, and valve-rods in elevation, and also showing a different packing for the valves. Fig. 4 is a transverse section on line $zz$ on Fig. 2. Fig. 5 represents in its upper half a transverse half-section on line $vv$ on Fig. 2, and in its lower half a similar half-section on line $ww$ on Fig. 2. Fig. 6 is a longitudinal half-section illustrating a form of my invention which I propose to use in applying my invention to engines already in use, and Fig. 7 is an end view of same.

In the drawings, A is the steam-cylinder provided at one side and at or near the center of its length with the steam-inlet pipe A', and at the opposite side with an exhaust-pipe, A², the former communicating with the semi-annular chamber B, which is separated from the semi-annular chamber B', with which the exhaust-pipe communicates, by the partitions $a$ and $a'$, which are shown in section in Fig. 4, and one of which is indicated by dotted lines in Fig. 2 and shown in longitudinal section in Fig. 3.

The semi-annular chamber B communicates with the annular steam-passages $b$ and $b'$, which respectively extend from opposite sides thereof toward the opposite ends of the cylinder, as shown in Fig. 2.

The passages $b$ and $b'$ are annular or extend entirely around the inner wall of the cylinder from $c$ to $d$; but from $d$ to or nearly to the opening of the ports into the cylinder the inner and outer walls of said passages are connected together by the tie-ribs $e\,e$, thus dividing said passages each into a series of passages or ports, $e'$, opening into the cylinder upon all sides thereof, as shown in the upper half of Fig. 5. In like manner the semi-annular chamber B' communicates upon opposite sides with the annular exhaust-passages $f$ and $f'$, which extend, respectively, toward the opposite ends of the cylinder from $g$ to $h$ in annular form, and from $h$ to or nearly to the points where they open into the cylinder the inner and outer walls of said passages are connected together by the tie-ribs $i$, thus dividing said passages each into a series of exhaust ports or passages, $i'$, opening into the cylinder upon all sides thereof, as shown in the lower half of Fig. 5.

C is the piston, of ordinary construction, and C' is the piston-rod, having a bearing in the packing-box D of the head E in a well-known manner.

The heads E and E' are secured to the cylinder in the usual manner, and are provided upon their inner sides with large inwardly-projecting hollow hubs, which in the case of new engines are made in the form of frustums of cones, as shown in Fig. 2; but when applied to remodeling old engines the said hubs are made cylindrical, as shown in Fig. 6.

F F are two ring slide-valves fitted to the inner bore of the cylinder, one at each end, and each provided with any suitable means of packing the same or causing it to work steam-tight upon its circular seat whether the same be inside or outside of said valve. Said ring-valves are made thinner at their outer edges than at their inner edges, so that their non-working circular surfaces are oblique to the axis of the cylinder, as shown in Figs. 2 and 6.

The cylinder-head E is provided with two packing-boxes, E², for the passage of the valve-rods G G, by which said valves F F are connected together and made to move as one, said rods G G passing through openings in the piston C, provided with packing-boxes $j\,j$ (see Fig. 4) to prevent the passage of steam from one side of said piston to the other as the rods move through said piston or the piston moves upon said rods.

The portion of the cylinder-head opposed to the oblique or frusto-conical surface of the valve is made parallel to said frusto-conical surface and at such a distance from the valve-seat that when the valve is moved into position to open the steam-ports said valve will substantially fill the annular space between the valve-seat and said frusto-conical surface of the head for the full longitudinal length of said valve, as shown at the right-hand ends of Figs. 2 and 6, and when the valve is moved into position to close the steam-ports and open the exhaust-ports an annular space will be opened between the frusto-conical surfaces of the valve and of the head to permit the free passage of the exhaust-steam to the exhaust-ports of the cylinder.

The inclined circular sides of the valves F F are each provided with two ears, k k, upon opposite sides of the piston-rod, in which ears are formed openings to receive the valve-rods G G, and the inclined circular surfaces of the cylinder-heads opposed thereto have semicircular notches cut therein to receive said ears, all as shown in Fig. 5.

For the purpose of remodeling old engines and applying my improved valves thereto I make the steam inlet and exhaust nozzles and ports in the cylinder-heads instead of in the cylinder and form the valve-seats upon the inwardly-projecting central portions of said heads, as shown in Figs. 6 and 7.

The great advantages of my invention are that with the use of slide-valves the steam is cut off at the inner surface of the cylinder, and the space to be filled with steam and wasted at each stroke of the engine is reduced to the minimum; and by virtue of the fact that the ports extend entirely around the circumference of the cylinder, except the spaces occupied by the tie-ribs e and i in cases where said ribs extend to the inner surface of the cylinder, I am enabled to reduce the stroke of the valves to a minimum.

In some cases I propose to cut the tie-ribs e and i short of the inner periphery of the cylinder, as shown in Fig. 3, thereby making a continuous port extending entirely around the cylinder, instead of making a series of ports separated only by thin partitions or ribs, as hereinbefore described.

What I claim as new, and desire to secure by Letters Patent of the United States, is—

1. In a steam-engine or other motor, a cylinder provided with inlet and exhaust pipes, inlet and exhaust chambers communicating with said inlet and exhaust pipes, respectively, annular inlet-passages communicating with either end of said inlet-chamber, annular exhaust-passages communicating with either end of said exhaust-chamber, and inlet and exhaust ports communicating, respectively, with said inlet and exhaust passages at either end of said cylinder and so constructed and arranged as to admit steam or other motive force to and exhaust it from said cylinder on all sides thereof, in combination with ring-valves at each end of said cylinder adapted to alternately open and close said inlet and exhaust ports, and having frusto-conical surfaces on the inside and a cylinder-head at each end of said cylinder, which is provided with an internally-projecting frusto-conical extension, the sides of which are parallel with the inner sides of said valves and are in contact therewith, or nearly so, when said valves have reached the extreme end of their movement toward the cylinder-heads.

2. In a steam-engine or other motor, a cylinder provided with inlet and exhaust ports at both ends thereof, and ring slide-valves in both ends thereof having seating-surfaces parallel to the axis of the cylinder and adapted to alternately open and close the said inlet and exhaust ports, and also provided with frusto-conical surfaces on the sides farthest from said ports, in combination with cylinder-heads provided with frusto-conical surfaces opposed to and parallel with the frusto-conical surfaces of the valves.

3. In a steam-engine or other motor, a pair of ring slide-valves arranged one in each end of the cylinder, and each having a circular seating-surface parallel to the axis of said cylinder, which valves are adapted to alternately open and close the ports of said cylinder, and are also provided with frusto-conical surfaces on the inside thereof, in combination with cylinder-heads provided with frusto-conical surfaces opposed to and parallel with the frusto-conical surfaces of the valves.

In testimony whereof I have signed my name to this specification, in the presence of two subscribing witnesses, on this 3d day of February, A. D. 1888.

FRANKLIN D. CHILD.

Witnesses:
N. C. LOMBARD,
GEO. A. SEWALL.